United States Patent [19]

Murakami

[11] Patent Number: 5,049,908
[45] Date of Patent: Sep. 17, 1991

[54] PHOTOGRAPHIC CAMERA AND FILM
[75] Inventor: Susumu Murakami, Tokyo, Japan
[73] Assignee: Sony Corporation, Tokyo, Japan
[21] Appl. No.: 399,028
[22] Filed: Aug. 28, 1989
[30] Foreign Application Priority Data Aug. 31, 1988 [JP] Japan ................................ 63-217825
Aug. 31, 1988 [JP] Japan ................................ 63-217826
Sep. 2, 1988 [JP] Japan ................................ 63-219740

[51] Int. Cl.[5] .......................... G03B 1/18; G03B 17/26
[52] U.S. Cl. ................................ 354/173.1; 354/275;
354/159; 354/218; 354/106; 354/288; 354/21
[58] Field of Search .................. 354/173.1, 173.11, 21,
354/275, 212, 215, 171, 159, 106, 218, 210, 288;
352/239, 69

[56] References Cited
U.S. PATENT DOCUMENTS

| 1,572,252 | 5/1920 | Tessier | 352/230 |
|---|---|---|---|
| 3,678,834 | 7/1972 | Melillo | 354/217 |
| 3,865,738 | 2/1975 | Lente | 352/239 |
| 4,101,912 | 4/1978 | Watanabe et al. | 354/106 |
| 4,146,321 | 3/1979 | Melillo | 354/159 |
| 4,183,645 | 1/1980 | Ohmura et al. | 354/106 |
| 4,396,164 | 8/1983 | Maeda et al. | 354/212 |
| 4,431,292 | 2/1984 | Takahashi | 354/173.11 |
| 4,490,027 | 12/1984 | Frank et al. | 354/21 |
| 4,860,037 | 9/1989 | Harley | 354/275 |

FOREIGN PATENT DOCUMENTS 2084746 4/1982 United Kingdom .

OTHER PUBLICATIONS

Patent Abstract of Japan, vol. 5, No. 1 (P-43) [673].
Patent Abstract of Japan, vol. 7, No. 262, (P-238) [147].
Patent Abstract of Japan, vol. 10, No. 9, (P-420) [2066].

Primary Examiner—W. B. Perkey
Assistant Examiner—Cessandra C. Spyrou
Attorney, Agent, or Firm—Lewis H. Eslinger; Jay H. Maioli

[57] ABSTRACT

A 35 mm-wide photographic film without any perforations typically used to transport this kind of film has one side of its rectangular effective photographic area in a widthwise direction made substantially 30 mm long, thereby widening this effective photographic area, so that the image quality is improved. A photographic camera using that 35 mm photographic film formed without perforations transports the photographic film accurately, and in which the position of the photographic film in its widthwise direction is defined and an image of an object is exposed to the effective photographic area of the photographic film.

61 Claims, 11 Drawing Sheets

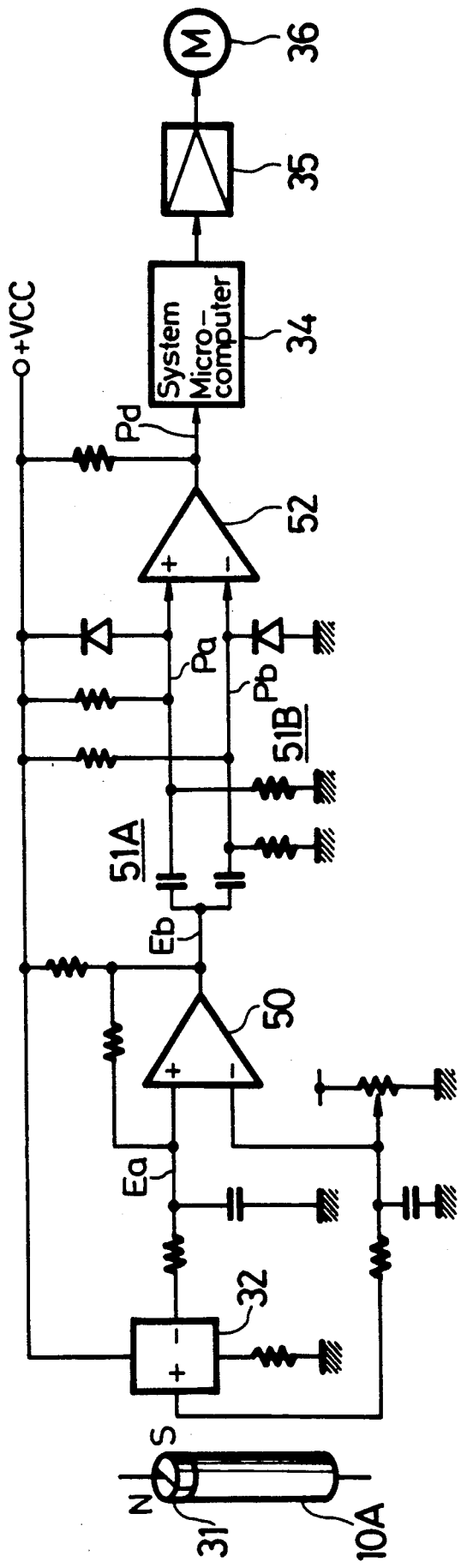

| | |
|---|---|
| FIG. 17A | 88.12.24 |
| FIG. 17B | 24.10:05 |
| FIG. 17C | 10:05.34 |
| FIG. 17D | 56. 500 |
| FIG. 17E | 14. L 12 |
| FIG. 17F | 70 - 135 |
| FIG. 17G | 105F 35 |

0 1 2 3 4 5 6 7 8 9 A b c d E F : . -

0 1 2 3 4 5 6 7 8 9 A B C D E F COLON PERIOD HYPHEN

PHOTOGRAPHIC CAMERA AND FILM

BACKGROUND OF THE INVENTION

1. Field of the Invention

The present invention relates generally to a photographic camera for exposing an image on 35 mm film and, more particularly, to 35 mm film and a camera that has an increased scene area on that film.

2. Description of the Background

A photographic film now widely used is 35 mm wide, and the photo-sensitive materials for forming such a photographic film and so on are standardized in Japanese Industrial Standard (JIS) and International Organization of Standards (ISO). In such standardized size the width between the upper and lower (outer) edges of the photographic film is 35 mm, and a plurality of rectangular perforations are aligned along both edges of the photographic film. The plurality of perforations are used to transport the photographic film as it is exposed and they may also be used during the development and printing processes. The length of a perforation in the widthwise direction of the photographic film is 2.79 mm and the length in the lengthwise direction of the photographic film is 1.98 mm. The distance (inside measurement) between the perforation and the edge of the photographic film is 2.01 mm and the distance (inside measurement) between the opposing perforations at both sides of the film is 25 mm wide. The pitch of the thus aligned perforations is 4.75 mm.

In the above-mentioned photographic film, one frame, which is the effective photographic area, is quadrilateral, for example, rectangular, in shape and is 24 mm in the widthwise direction of the film. The pitch of the frames is 38 mm, which is eight times the pitch of the perforations, which pitch is taken as a reference.

In order to improve the resultant image quality obtained from such photographic film the following proposals have been made: (1) The photo-sensitive material coated on the photographic film should be improved in an effort to improve resolution; and (2) The width of the photographic film should be increased to increase the frame size so that resulting prints would require less magnification and would appear sharper.

In general, the particle size of the photo-sensitive material in the coating determine the resolution and the sensitivity of the photographic film, and these two parameters are inversely related. Hence, without the discovery of a new photo-sensitive material, it is difficult to improve the image quality of the photographic film according to proposal (1) above. Also, such proposal would involve a large amount of time and expense in developing a new photographic film.

Although the image quality of the photo-sensitive materials now available can be improved according to proposal (2) above, this involves an increase in the width of the photographic film. Thus, the photographic camera must necessarily also be increased in size and weight, which goes contrary to the recent trend that seeks to reduce the size and weight of photographic cameras. Furthermore, all existing equipment for manufacturing photographic film and for developing photographic film would have to be modified in accordance with the increased width of the proposed new photographic film.

As described above, the image quality of photographic film, especially the resolution cannot be improved without changes and modifications to the photographic film itself. Thus, the photographic camera must be improved to achieve the above-mentioned objects.

Two other proposals have been made for that purpose. (1) A portion of the image that is picked-up can be trimmed by changing the magnification of the lens attached to the camera body; and (2) The effective photographic area can be increased recording magnification control data or the like for the printer capability in an area between the frames.

According to proposal (1), the photographic capability is improved by trimming a portion of an image with the result that although the image quality is improved, the necessary image has to be cut. Furthermore, this proposal requires an expensive lens, such as a telephoto lens.

Proposal (2) above is disclosed in U.S. Pat. No. 4,780,735. As described in U.S. Pat. No. 4,780,735, close-up photography is achieved without requiring an expensive zoom lens by limiting the photographic area of the film. Upon printing this limited area the magnification is increased so that the apparent close-up is effected by utilizing a standard lens instead of the expensive zoom lens. U.S. Pat. No. 4,780,735 also discloses a technique in which a 17-bit code, namely, control information for the trimming, date information, and the like is recorded in the blank area between the successive frames of the photographic film.

One problem with U.S. Pat. No. 4,780,735, however, is that if the film used is slide film, the area between the frames is cut away or covered when a slide support frame is attached to the frame following development. Thus, there is the likelihood that the data at the interframe area will be lost or that the data at that area will be hidden by the slide support frame.

If the film used is a negative film, then the film has to be kept intact without being cut when it is developed and printed on the print sheet or when it is preserved. Thus, there is then a disadvantage that it is inconvenient to preserve the film.

OBJECTS AND SUMMARY OF THE INVENTION

Accordingly, it is an object of the present invention to provide a camera and film that can provide improved image quality and that can eliminate the defects inherent in previously proposed cameras and film.

It is another object of the present invention to provide a photographic film in which the effective photographic area in the widthwise direction is increased in order to improve the resultant image quality without changing the film width or the sensitivity of the photosensitive material and to provide a photographic camera that uses the above-mentioned photographic film.

It is a further object of the present invention to provide a photographic camera in which a photographic film having an increased effective photographic area in its widthwise direction can be transported at a correct frame pitch.

It is a still further object of the present invention to provide a photographic camera that can record data in an unused area on the film that is made available by increasing the effective photographic area in the widthwise direction of the photographic film.

According to an aspect of the present invention, a photographic camera system using 35 mm-wide photographic film involves a 35 mm photographic film having a quadrilateral effective photographic area of which one side in the widthwise direction is selected to be substantially 30 mm long, a cartridge for accommodating the photographic film that is in turn accommodated in a first accommodating portion formed in the camera body, and a second accommodating portion formed in the camera body to accommodate the photographic film supplied from the cartridge. The film is transported between the first and second accommodating portions by a transport mechanism in the camera body, and a guide is provided in the camera body for defining the position of the photographic film in its widthwise direction between the first and second accommodating portions. An exposure mechanism is provided in the camera body for exposing an image of an object on the effective photographic area of the photographic film that is guided by the guide.

According to another aspect of the present invention, there is provided a photographic camera system using 35 mm film that includes a 35 mm photographic film having a rectangular effective photographic area of which one side is roughly 30 mm long, with a camera body for accommodating a cartridge containing the photographic film in a first accommodating portion and a second accommodating portion formed in the camera body and for receiving photographic film supplied from the cartridge. A film transport mechanism transports the photographic film between the first and second accommodating portions, and it is guided by a guide device provided in the camera body that defines the position of the photographic film in the widthwise direction between the first and second accommodating portions. An exposure mechanism is provided in the camera body for exposing an image of an object onto the effective photographic area of the photographic film that is guided by the guide device. A data recording system records information in an area between the end edge portion of the photographic film and the end edge portion of the effective photographic area.

According to a further aspect of the present invention, there is provided a photographic camera using a 35 mm photographic film that includes a camera body having first and second accommodating portions formed therein for accommodating the 35 mm film, which is transported from the first accommodating portion to the second accommodating portion. A quadrilateral aperture is formed in the camera body on a film transporting path from the first accommodating portion to the second accommodating portion and is dimensioned so that one side of the aperture in a film-width direction is approximately 30 mm long, so as to form a quadrilateral effective photographic area that is approximately 30 mm in the film-width direction.

According to still a further aspect of the present invention, a photographic camera using 35 mm film comprises a camera body, first and second accommodating portions formed in the camera body for accommodating the 35 mm-wide photographic film, a transporting mechanism provided in the camera body transports the photographic film from the first accommodating portion to the second accommodating portion, a quadrilateral aperture is formed in the camera body in a film transporting path from the first accommodating portion to the second accommodating portion, one side of which in the film-width direction is selected to be 30 mm long, so that a quadrilateral effective photographic area whose one side in the film-width direction is 30 mm long is formed in the film as it is extended along the film transporting path. A recording system is provided for recording information in an area between the end edge portion of the photographic film and the end edge portion of the effective photographic area.

Also provided by the present invention is a film cartridge with a photographic film 35 mm wide having a quadrilateral effective photographic area whose one side in the film-width direction is substantially 30 mm long, and which cartridge accommodates the photographic film.

These and other objects, features, and advantages of the present invention will be apparent in the following detailed description of preferred embodiments when read in conjunction with the accompanying drawings, in which like reference numerals identify the same or similar elements in the several views.

BRIEF DESCRIPTION OF THE DRAWINGS

FIG. 10 is a schematic diagram of an example of a film transport detecting circuit used in the film transporting system of FIG. 9;

FIGS. 11A to 11D are waveform diagrams of signals present in the operation of the film transport detecting circuit of FIG. 10;

FIG. 16 is a plan view of a portion of film in which photographic data is recorded according to the present invention;

FIGS. 17A to 17G and 17H are, respectively, schematic diagrams showing examples of various photographic data recorded on photographic film according to the present invention, and numerals and characters used to record the above data on the photographic film;

DETAILED DESCRIPTION OF PREFERRED EMBODIMENTS

In order to accomplish the above-mentioned objects according to the present invention, conventional 35 mm photographic film will be first considered, then it will be explained how to increase the effective photographic area of that known photographic film in its widthwise direction by eliminating the perforations that typically engage with sprockets in the camera to transport the photographic film. The manner in which the flatness of the photographic film is maintained by using the portions outside the effective photographic area thereof will be considered next. Then the problem of how to accurately transport the photographic film by a predetermined pitch, even though the conventional perforations are removed, will be discussed. Lastly, how to make effective use of the photographic film outside the effective photographic area by the elimination of the conventional perforations will be explained.

Figure 1:
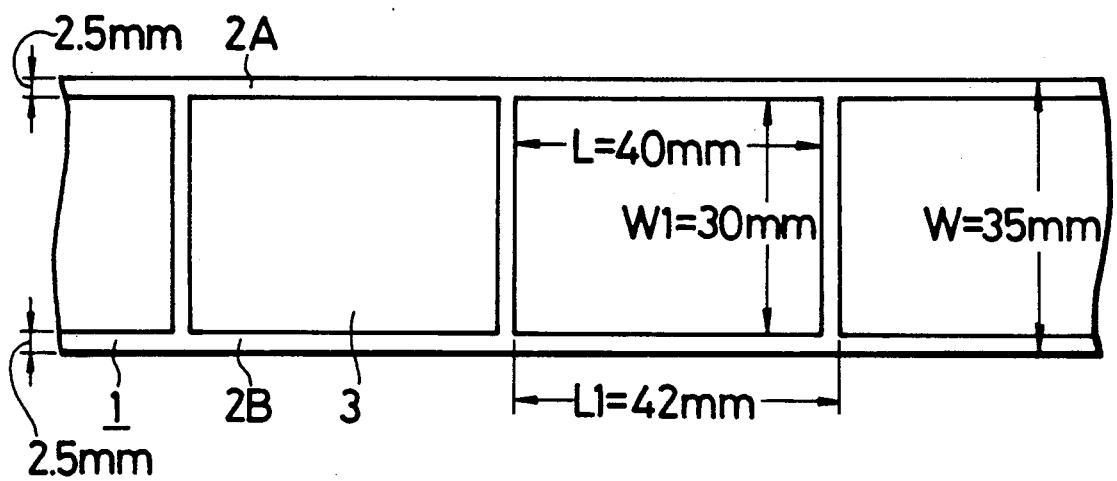
FIG. 1 is a plan view of a portion of the 35 mm-wide photographic film according to the present invention.
Figure 2:
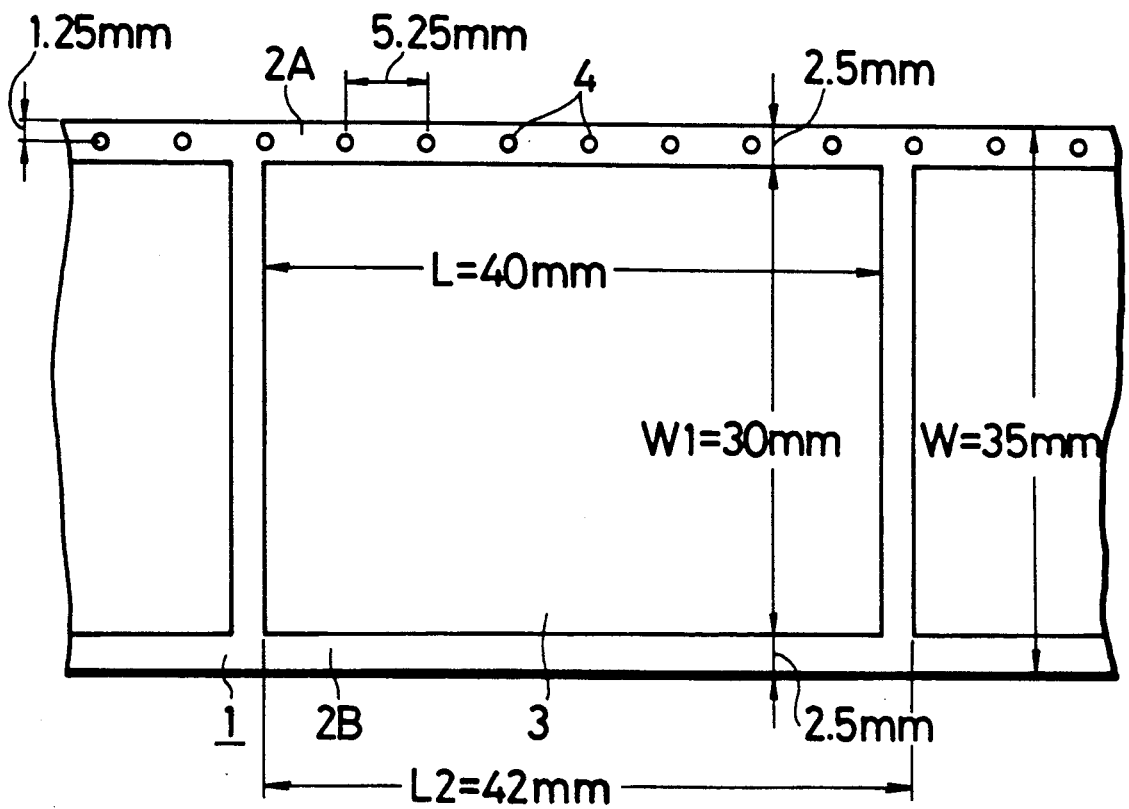
FIG. 2 is a plan view illustrating another embodiment of the 35 mm-wide photographic film according to the present invention.

In FIG. 1, one format of photographic film according to the present invention is shown, and FIG. 2 is another example of a photographic film format according to the present invention.

Figure 3:
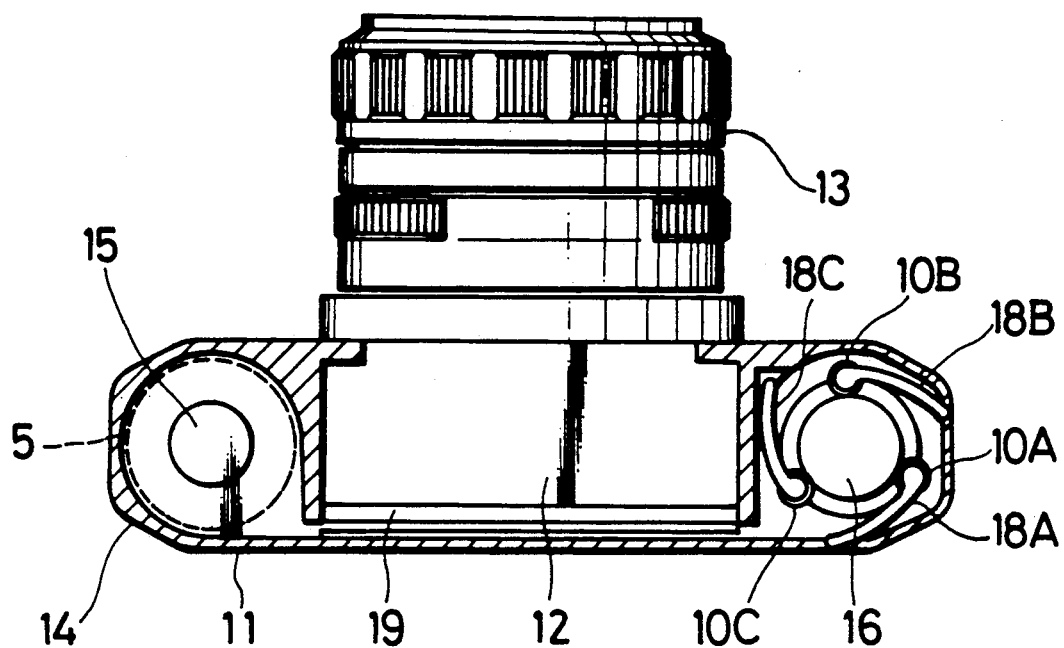
FIG. 3 is a plan view in partial cross section showing an embodiment of a 35 mm photographic camera according to the present invention.
Figure 4:
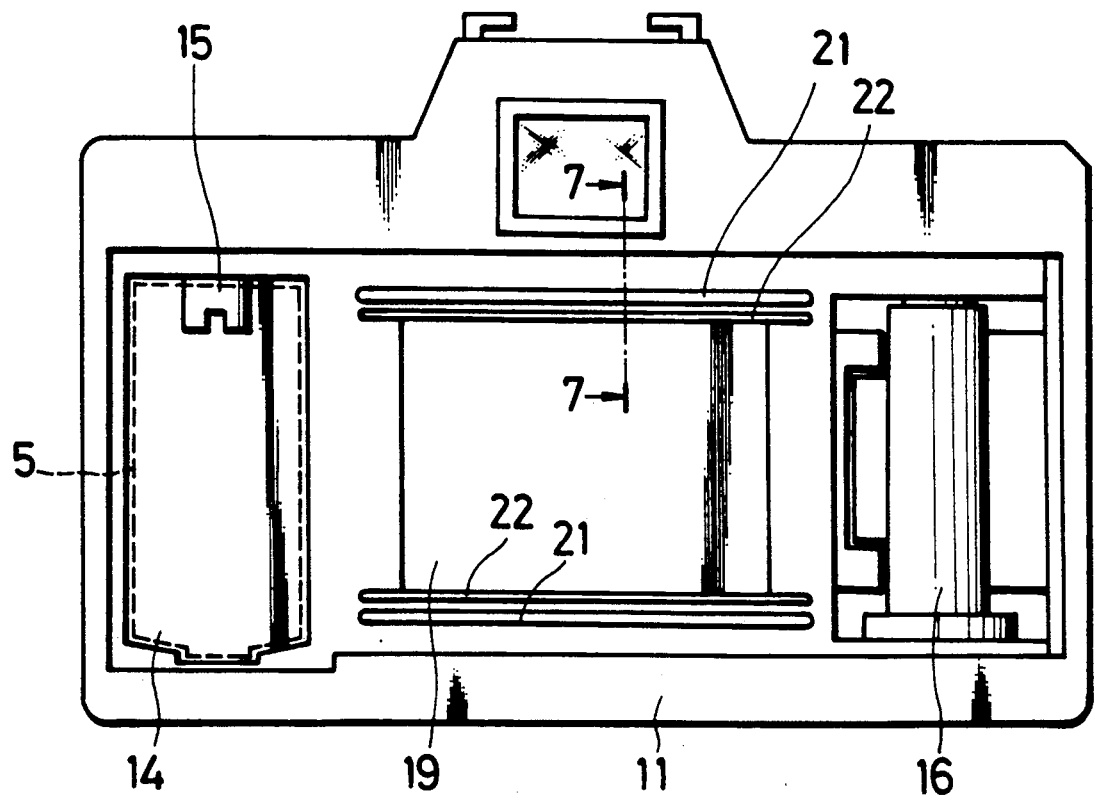
FIG. 4 is a rear elevational view of the 35 photographic camera shown in FIG. 3 with the rear cover removed.

In FIG. 1, a photographic film 1 has a width W that is selected to be equal to commercially available photographic film, namely, 35 mm, however, photographic film 1 is not provided with perforations like the known film. A frame 3 in photographic film 1 defines an effective photographic area whose effective width W1 is selected to be 30 mm and whose effective length L in the lengthwise direction of photographic film 1 is selected to be 40 mm. A pitch L1 of frame 3, which is the transport pitch of photographic film 1, is selected as 42.0 mm. Photographic film 1 having the above-mentioned film format is accommodated in a film cartridge 5, as shown in FIGS. 3 and 4.

Comparing the image of the effective photographic area 3 of photographic film 1 according to the present invention with the image of the effective photographic area of 35 photographic film now available on the market, frame 3 of photographic film 1 is selected to be 30 mm long in width W1 while the frame of the exiting photographic film is 24 mm long in width. Thus, the width W1 of frame 3 of photographic film 1 of the invention is 1.25 times as large as that of the frame of the existing photographic film. It must therefore be noted that the resultant image quality of frame 3 of photographic film 1 in the film width direction should be increased by 25% over conventional film.

Assuming that the length L of frame 3 of photographic film 1 is enlarged by the same ratio as the width W1, then the area of frame 3 of the photographic film 1 will be 1.56 times (1.25 × 1.25) the area of the frame of the photographic film now available. Thus, the available image quality of frame 3 of photographic film 1 should be improved by about 56%, as compared with a frame of conventional 35 mm photographic film.

Further comparing the area of frame 3 of photographic film 1 with the area of the frame of the photographic film now available:

The area of frame 3 of photographic film 1 of the present invention is;

$$30 \text{ mm} \times 40 \text{ mm} = 1200 \text{ mm}^2$$

and the area of the frame of the existing photographic film is;

$$24 \text{ mm} \times 36 \text{ mm} = 864 \text{ mm}^2$$

Thus, the area of frame 3 of photographic film 1 is increased by about 39% compared with the area of the frame of the existing photographic film, and the available image quality of the frame 3 will be increased by about 39% compared with the possible image quality obtainable from a frame of existing photographic film.

As described above, according to the film format of the present invention, which has the same overall width W as existing 35 mm film, the width W1 of frame 3, which is the effective photographic area, is increased and the portion outside the effective photographic area of the conventional 35 mm film can also be effectively utilized. According to the photographic film of the present invention, if an image of the same image quality as that of existing photographic film is to be produced, it becomes possible to provide a larger picture or, alternatively, it is possible to use less magnification to provide the same size picture, thereby resulting in a sharper picture.

In the film format of the present invention, the overall width W of photographic film 1 is selected to be the same as that of the existing 35 mm-wide photographic film so that conventional facilities such as existing photographic film manufacturing apparatus, apparatus for developing photographic film and the like can be utilized without any modifications or changes being required. Thus, the facilities for existing 35 mm-wide photographic film can also be used for manufacturing and developing the photographic film of the present invention. For example, apparatus for slitting wide photo-sensitive film on which photo-sensitive material has been coated to provide a photographic film 35 mm wide, apparatus for manufacturing a standardized 35 mm film cartridge, apparatus for winding the photographic film into the cartridge and the like are now automated in large-scale facilities. For the photographic film of the present invention, these facilities can be utilized without modification thereof.

Further, treatment of the film, such as developing, printing, enlarging, and so on after the cameraman takes a picture are now automatically carried out, and each such apparatus for subsequent film treatment is designed to deal with 35 mm-wide photographic film. This treatment apparatus can also be used for the photographic film of this invention without any change.

The image quality or the resolution of the frame of the photographic film of the invention can be improved as described above. According to the photographic film of the present invention, there are presented the following advantages because the width W1 of the frame 3 is selected to be 30 mm. That is, according to the invention, band-shaped non-photographic areas 2A and 2B each having a length of 2.5 mm are respectively provided between upper and lower edges of the frame 3 and upper and lower edge of the photographic film 1, and these non-photographic areas 2A and 2B make it possible to maintain the flatness of photographic film 1, to control photographic film 1, to read and write data, and so on when the cameraman takes a picture. Further, the photographic camera needs no sprockets to transport the photographic film, and the camera can, as a result of this, be made compact in size and light in weight.

FIG. 2 is another embodiment of a photographic film 1 according to the present invention, in which the width W of the photographic film 1 is also the same as that of the existing photographic film, namely, 35 mm and a plurality of small apertures 4 are formed through the film along the non-photographic area 2A. Apertures 4 are used to detect the transport amount of photographic film 1 as it is advanced. The format of this embodiment is similar to that of the photographic film 1 shown in FIG. 1, namely, frame 3 has an effective photographic area that is 30 mm long in width W1 and 40 mm long in length L. More specifically, small apertures 4 each have a diameter of 1 mm and are aligned down from one edge of photographic film 1 by approximately 1.25 mm, namely, on the central line between the upper edge of the photographic film 1 and the upper edge of the frame 3 at a predetermined pitch, for example, 5.25 mm. Apertures 4 may also be arranged in the lower non-photographic area 2B. Apertures 4 are used, when the photographic film 1 is transported in the camera body, to form frame 3 on photographic film 1 at a predetermined pitch. More specifically, when the counted number of small apertures 4 reaches a predetermined value, the transport of the photographic film 1 is stopped, so that the frame 3 is automatically transported at a correct pitch of, for example, 42 mm in the example of FIG. 2.

FIG. 3 is a partial cross-sectional view of an embodiment of a photographic camera according to the present invention, in which the portion parallel to the bottom of the camera portion or dark chamber is illustrated in cross section. FIG. 4 is a rear view of the photographic camera of FIG. 3 with its rear cover removed.

Referring to FIG. 3, a dark chamber or box 12 is located at a central portion of a camera body 11, and a lens system 13 is mounted to the front opening portion of dark box 12. A film cartridge accommodating portion 14 is formed at one side portion of camera body 11, for example, on the left-hand side in FIGS. 3 and 4, and a spool shaft 15 is formed on the center of cartridge accommodating portion 14. When the cameraman loads the camera in preparation to take a picture, cartridge 5 having the above-described photographic film therein is set in cartridge accommodating portion 14 so as to engage with spool shaft 15.

A film wind shaft 16 is mounted on the other side portion of camera body 11, for example, on the right-hand side in FIGS. 3 and 4. Film wind shaft 16 is driven to wind photographic film 1 preferably using a motor (not shown).

Figure 5:
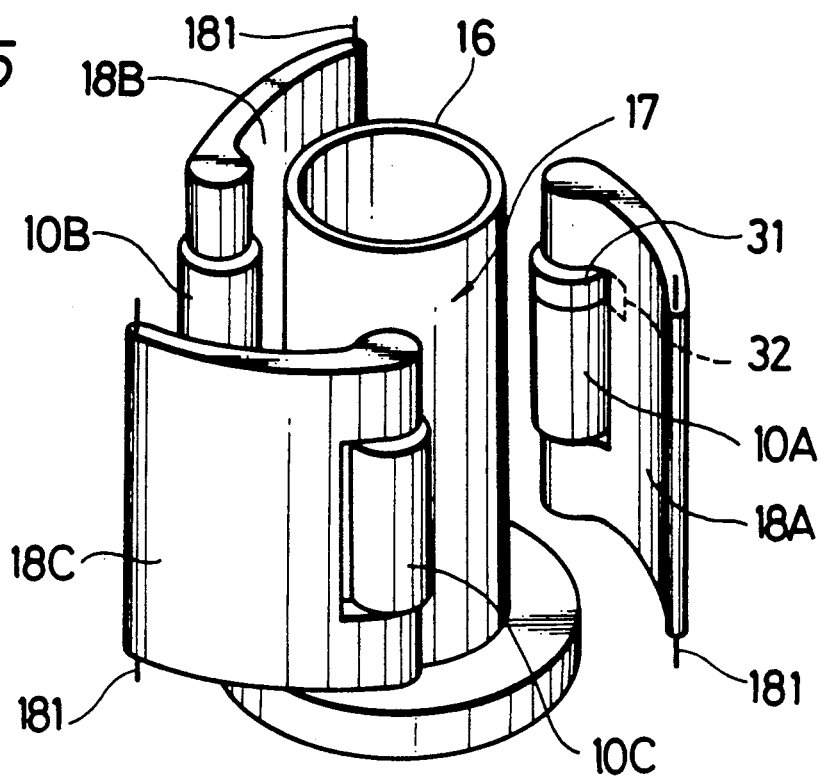
FIG. 5 is a perspective view of a film transporting mechanism and detecting mechanism used in the photographic camera of FIG. 3.
Figure 6:
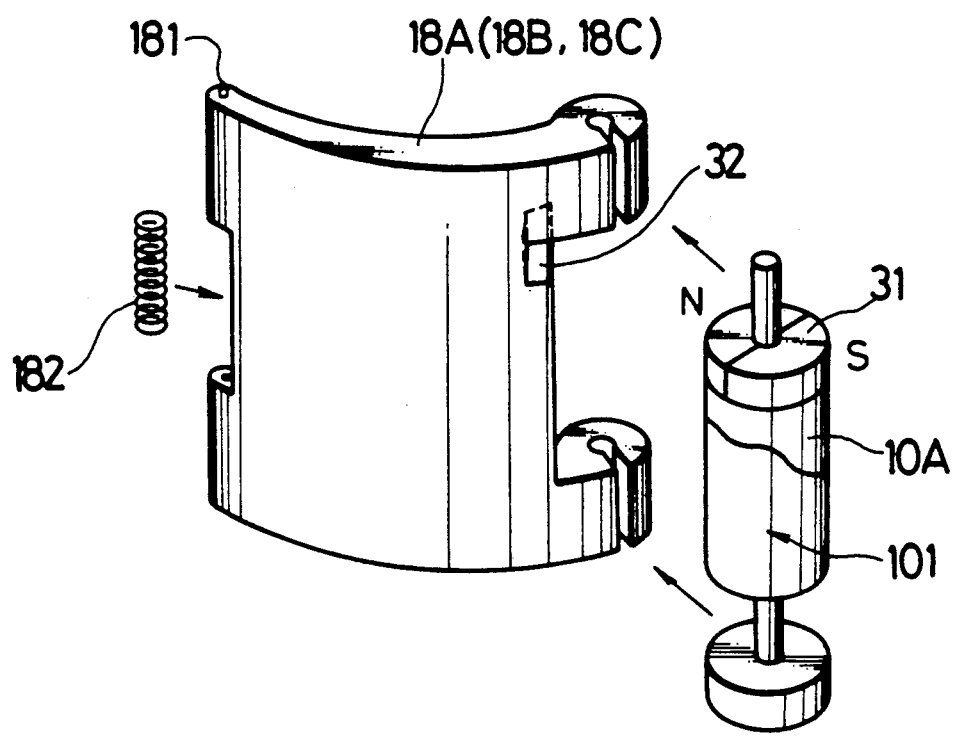
FIG. 6 is an exploded perspective view showing the detecting mechanism of FIG. 5 in more detail.

As shown in FIG. 5, the peripheral surface of film wind shaft 16 is coated with a coating material 17 such as neoprene having high friction properties, and three film guides 18A to 18C, for example, are arranged around film wind shaft 16. Each of the guides 18A to 18C provides a linear surface parallel to the central axis of the film wind shaft 16 and provides an arcuate surface in the direction perpendicular to the central axis of film wind shaft 16. As shown in FIG. 6, one end portion 181 of each of the arcuate film guides 18A to 18C is pivotably supported to the camera body, and the other end thereof is spring-biased to contact with the film wind shaft 16 by a torsion spring 182 located at the pivotted end. Film guide rollers 10A to 10C are rotatably supported in the film guides 18A to 18C at the respective end portions adjacent the film wind shaft 16, so that they are arranged parallel to the central axis of film wind shaft 16.

The structure of film guides 18A, 18B and 18C is shown more in detail in FIG. 6, in which roller 10A of film guide 18A has a predetermined diameter, and a permanent magnet 31 is secured to one end, for example, the top of film guide roller 10A. Permanent magnet 31 is magnetized with N and S poles in its radial direction, and the film guide 18A has a magnetic sensor 32, for example, a Hall element, mounted at a position opposing permanent magnet 31.

Referring back to FIGS. 3 and 4, it will be seen that through the rear portion of dark box 12 there is formed a quadrilateral or rectangular aperture 19. This rectangular aperture 19 is selected to have a length of 30 mm (in the widthwise direction of film 1) to define frame 3 of photographic film 1. As will be described, when the cameraman takes a picture, aperture 19 does not come in close contact with photographic film 1 and the light arriving through the lens system 13 incident on photographic film 1 is not collimated, so that while the size of frame 3 of photographic film 1 is 30 mm × 40 mm, the size of aperture 19 is slightly smaller than 30 mm × 40 mm.

Figure 7:
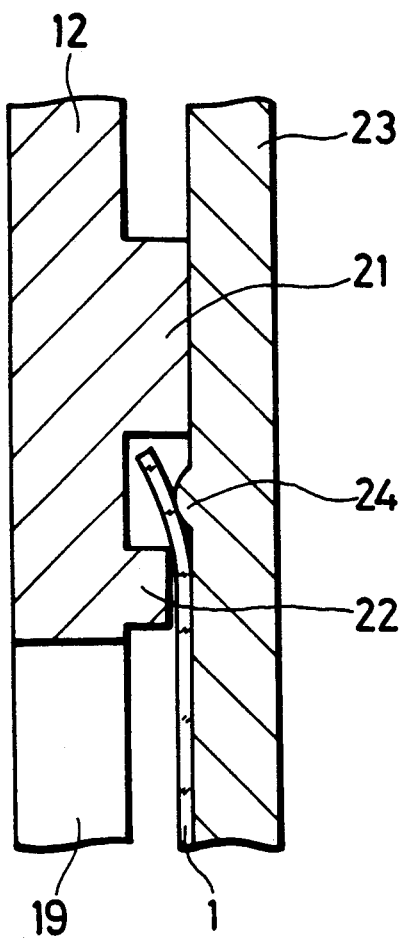
FIG. 7 is an enlarged, cross-sectional view taken through section line 7—7 in FIG. 4 with photographic film loaded in the camera.

As shown in FIG. 7, which is an enlarged, cross-sectional view taken through section line 7—7 in FIG. 4, two pairs of film guide rails 21 and 22 are respectively formed on the rearwardly facing, inner surface of dark box 12 along, and at least over the portions corresponding to the top and bottom edges of aperture 19. The pair of outside film guide rails 21 are located apart from each other by a distance substantially equal to 35 mm so as to define the position of the photographic film 1 in its widthwise direction relative to the aperture 19. The pair of film guide rails 21 are formed parallel with each other and are also made thicker than the inside film guide rails 22 by an amount at least equal to the thickness of the photographic film 1. The pair of inside film guide rails 22 are respectively formed near the upper and lower edge portions of aperture 19 and parallel therewith.

Figure 8:
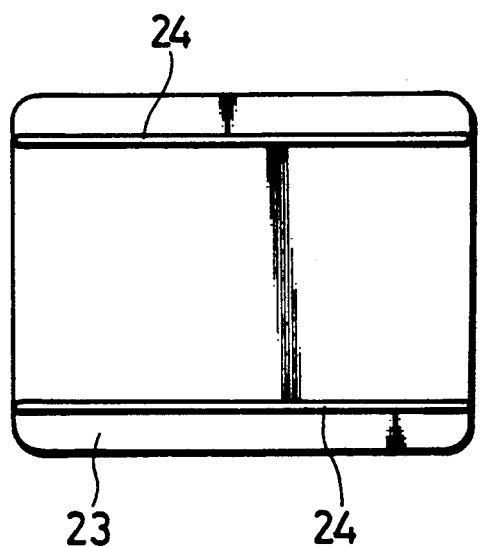
FIG. 8 is a front elevational view of an example of a film pressure plate used in the photographic camera of FIG. 3.

A film pressure plate 23 in FIG. 8 is attached to the inner or front surface of the rear cover (not shown) of camera body 11 through some suitable means, such as a pressure spring, for example. A pair of rails 24, each having a predetermined height, are respectively mounted on the front surface of film pressure plate 23 at positions corresponding to the locations between film guide rails 21 and 22 and parallel to film guide rails 21. The location of photographic film 1 is defined by film guide rails 22 in a widthwise direction and rails 24 contact the upper and lower edge portions of photographic film 1 in the forward direction or left-hand direction of FIG. 7 so that the remaining portion of photographic film 1, that is, the area of frame 3, is brought in close contact with pressure plate 23. Rails 24 are not necessary in order to provide flat contact between film 1 and pressure plate 23.

Accordingly, even though frame 3 of film 1 is made 30 mm long in a widthwise direction and each of the areas between the upper and lower edges of frame 3 and the upper and lower edges of the photographic film 1 is only 2.5 mm wide, the film area corresponding to frame 3 can be given the necessary flatness by pressure plate 23.

It should be understood that other elements, such as viewfinder, stop, shutter, and the like of the camera according to the present invention are formed similarly to those of existing photographic cameras. Nevertheless, the photographic camera of the present invention is provided with an inventive film transport amount detecting circuit shown, for example, in FIGS. 9 and 10.

According to the above-mentioned arrangement, when the cameraman prepares to take a picture, cartridge 5 is set in the accommodating portion 14 and photographic film 1 is withdrawn from cartridge 5 across aperture 19 to film wind shaft 16, so that by means of film guides 18A to 18C and film guide rollers 10A to 10C when film wind shaft 16 is rotated photographic film 1 is wound around film wind shaft 16. Thus, photographic film 1 can be transported without requiring film transporting perforations used in the conventional film.

Figure 9:
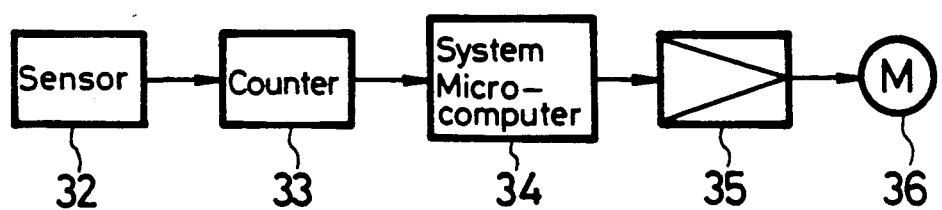
FIG. 9 is a block diagram of an example of the film transporting system used in the photographic camera of the present invention.

When photographic film 1 is transported film guide rollers 10A to 10C and permanent magnet 31 are rotated in accordance with the movement of the film. The revolution of permanent magnet 31 is detected by magnetic sensor 32 and the detected output is counted by a counter 33 and the count output from counter 33 is supplied to a system controller 34 (formed of a microcomputer), as shown in FIG. 9. System controller 34 is used to control the operation of the entire photographic camera, for example, to determine the number, shutter speed, and the like. Because guide roller 10A of film guide 18A is rotated one revolution per each predetermined transport amount of photographic film 1, the amount of photographic film 1 being transported is detected on the basis of the count output of counter 33. Then, the revolutions of a drive motor 36, which drives film wind shaft 16, is controlled through a motor drive amplifier 35 so that the transport amount of photographic film 1 corresponds to the count value to determine to the size of frame 3. As a result, photographic film 1 is transported at the pitch of frame 3.

FIG. 10 is an embodiment of a detecting circuit that detects the transport amount of photographic film 1. Assuming that the film transport pitch corresponding to frame 3 is 42.0 mm, then:

42.0 mm = 5.25 mm × 8.

That is, the film transport pitch is selected to be equal to an integer multiple of the minimum detectable value of film transport. In other words, the diameter of detection roller 10A is determined so that the minimum detection value of the film transport amount is 5.25 mm. Such that:

5.25 mm = π × 3.34 mm/2

Thus, when the diameter of detection roller 10A is selected as 3.34 mm, the transport amount of photographic film 1, or the resolution, corresponds to one-half revolution of roller 10A. As seen from FIG. 6, permanent magnet 31 is formed as a magnet having a dipole doughnut shape.

The Hall element or magnetic sensor 32 senses magnet 31 and generates a detected voltage Ea that changes in amplitude in response to revolutions of permanent magnet 31, as shown in FIG. 11A. As shown in FIG. 10, this voltage Ea is supplied to a voltage comparing circuit 50, wherein it is waveform-shaped to a square wave voltage Eb, having a period corresponding to the revolution of permanent magnet 31, as represented by waveform Eb in FIG. 11B. The voltage Eb is supplied to differentiating circuits 51A and 51B that generate differentiated pulses Pa and Pb. The pulses Pa and Pb correspond respectively to the trailing and leading edges of the voltage waveform Eb and are shown in FIG. 11C.

The pulses Pa and Pb are supplied to a voltage comparing circuit 52 that generates one pulse Pd at every half period of the voltage Ea, or at every one-half revolution of the magnet 31, and such pulses Pd are shown in FIG. 11D. This pulse signal Pd is supplied to system controller 34, which can comprise a microcomputer.

System controller 34 is adapted to control the operation of the entire photographic camera, for example, to determine the f-stop number, the shutter speed, and the like as earlier noted. Each time roller 10A of film guide 18A rotates by one-half turn, photographic film 1 is transported a length equal to 5.25 mm. Thus, system controller 34 controls through motor drive amplifier the rotation of drive motor 36 connected to film wind shaft 16, so that the number of the pulses Pd equals the count value corresponding to the size of frame 3. For example, if the pitch is 42 mm, photographic film 1 is transported until eight pulses Pd are obtained, and photographic film 1 is therefore transported at the pitch of one frame corresponding to the above-described format.

In the photographic camera with the structure of the film guide and the film transport detecting circuit of this embodiment of the present invention, even if the perforations used to transport the photographic film are not present, the photographic film can be transported at the correct frame pitch. Furthermore, magnet 31 for detecting the transport amount of photographic film 1 is a dipole magnet, which provides considerably reduced manufacturing costs.

In the film transport detecting circuit of FIG. 10, the leading and trailing edges of the resultant voltage Eb are both counted to detect the amount of photographic film that is transported. Thus, even when magnet 31 is a dipole magnet, the resolution provided when detection roller 10A detects the amount of photographic film 1 that is transported can be ½ revolution.

When the diameter of detection roller 10A is small, the slip between the photographic film 1 and the detection roller 10A becomes large, thus resulting in a lowering of detection accuracy. When the diameter of roller 10A is large, however, roller 10A needs a large torque to transport the photographic film 1. Thus, without increasing the motor size the slip between the photographic film and roller 10A also becomes large, whereby the detection accuracy is lowered in this case too. Nevertheless, applicant has found that if the diameter of roller 10A is selected to be 3.34 mm as described above, the above-mentioned problem does not occur and the amount of photographic film being transported can be properly detected.

Figure 12:
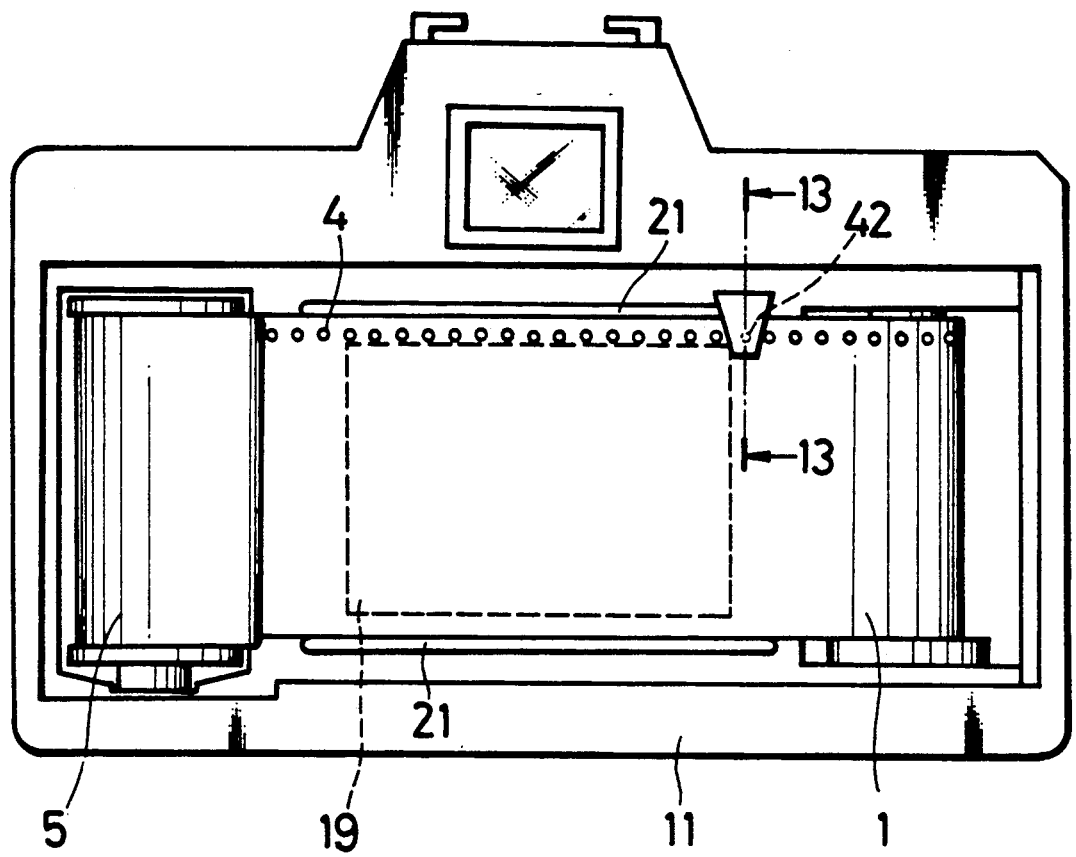
FIG. 12 is a rear elevational view of another embodiment of the film transport detecting mechanism according the present invention.
Figure 13:
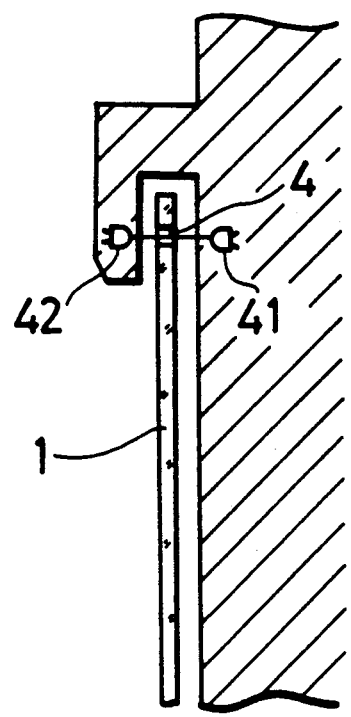
FIG. 13 is an enlarged, cross-sectional view taken along the section line 13—13 in FIG. 12.

Another example of a detector for detecting the transport of photographic film is described with reference to FIGS. 12 and 13. FIG. 12 is a rear view of the camera of the present invention in which the aforenoted photographic film 1 is loaded and the rear cover is removed. FIG. 13 is an enlarged, cross-sectional view taken through the line 13—13 in FIG. 12. In each of FIGS. 12 and 13, there is employed the photographic film 1 having the format in which the plurality of small apertures 4 are aligned as shown in FIG. 2.

Referring to FIGS. 12 and 13, a light emitting diode (LED) 41 of the photo-interrupter kind and a photo-transistor 42 are mounted on the camera body 11 at the position downstream of the film 1 at a location corresponding to the upper edge portion of aperture 19, so that LED 41 and photo-transistor 42 sandwich small aperture 4 from both surfaces of photographic film 1. The light emission wavelength of the LED 41 and the sensitivity peak of the photo-transistor 42 are selected to be in the infra-red ray wavelength range, for example, 940 nanometers.

In general, because photographic film has low transmissivity for infra-red rays, as compared with a visible light, a level difference between the outputs from the photo-transistor 42 for the small aperture 4 and other portions is enhanced, thereby making it possible to positively detect small aperture 4. Further, LED 41 emits only infra-red light rays, thereby preventing the photographic film 1 from being undesirably exposed.

Thus, when photographic film 1 is transported, the infra-red light rays emitted from LED 41 and received at photo-transistor 42 are turned on and off in accordance with the movement of small apertures 4, whereby photo-transistor 42 generates a detection pulse that indicates the movement of each small aperture 4. Upon supplying the detection pulse to counter 33 in the detecting circuit of FIG. 9, it is possible to control the transport amount of photographic film 1 in the fashion described above.

Figure 14:
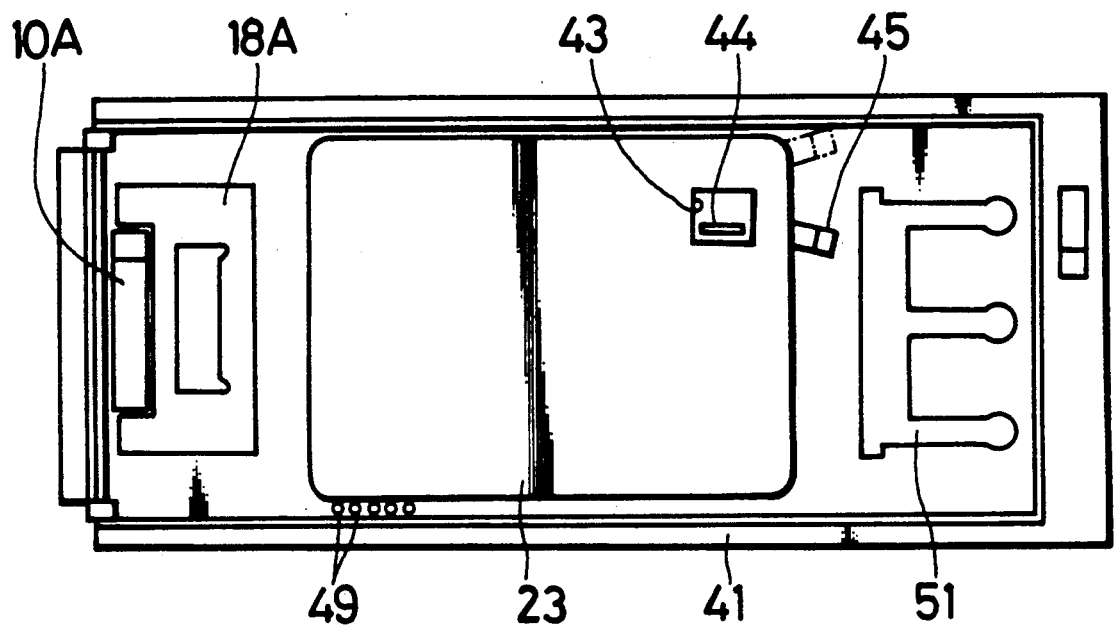
FIG. 14 is a front elevational view of another embodiment of the film pressure plate mounted on the rear cover of the photographic camera of FIG. 3.
Figure 15A:
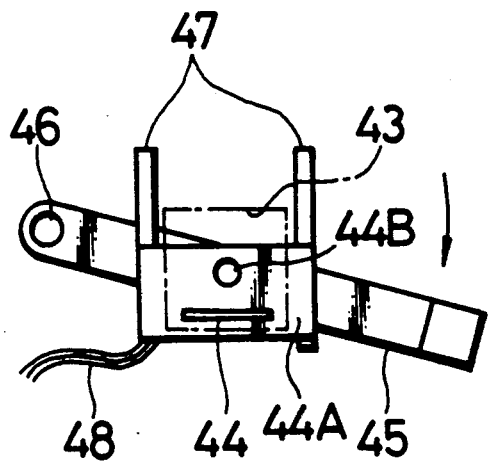
FIGS. 15A and 15B are elevational views of the data recording system according to the present invention.
Figure 15B:
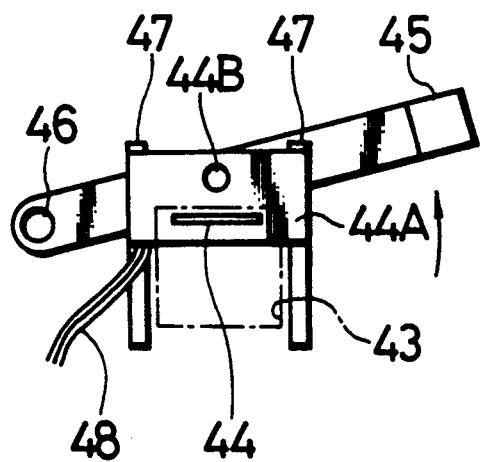

FIG. 14 is another example of the film pressure plate attached to the inner surface of the rear cover of the camera body, in which film pressure plate 23 is attached to the front or inner surface of rear cover 41 at a location opposing the aperture 19 of FIG. 12 in camera body 11. Film pressure plate 23 is larger than aperture 19, is quadrilateral or rectangular in shape, and does not include the rails that were shown in FIG. 8. Film pressure plate 23 has formed therein a through-hole 43 at a location corresponding to a corner of a frame of the photographic film. Arranged behind through-hole 43 are six light emitting element groups 44. As shown in FIGS. 15A-15B, these six groups 44 are aligned on a support plate 44A in the lengthwise direction of the photographic film. For example, each of the light emitting element groups 44 has a squarish B-letter resulting from a seven segment configuration. The light emitting element groups 44 are pivotally mounted at the center of a change-over lever 45 by a pin 44B, and one end of the lever 45 is pivotally mounted to rear cover 41 by a pin 46.

Thus, when the free end of lever 45 is moved upward and downward around pin 46 as shown in FIGS. 15B and 15A, respectively, light emitting element groups 44 are moved in the widthwise direction of the photographic film. Support plate 44A and, hence, the light emitting element groups 44, are guided by guide rails 47 so as to move linearly in the widthwise direction of the photographic film 1. Support plate 44A and light emitting element groups 44 can be stabilized by a torque spring (not shown) at the end positions shown in FIGS. 15A and 15B, respectively.

Each of the light emitting element groups 44 is electrically connected through cables 48 and contacts 49 to the system controller. Arcuate film guide 18A and film guide roller 10A are mounted in rear cover 41. A leaf spring 51 urges the film cartridge (not shown) into placement in the camera body.

Figures 16, 17H:
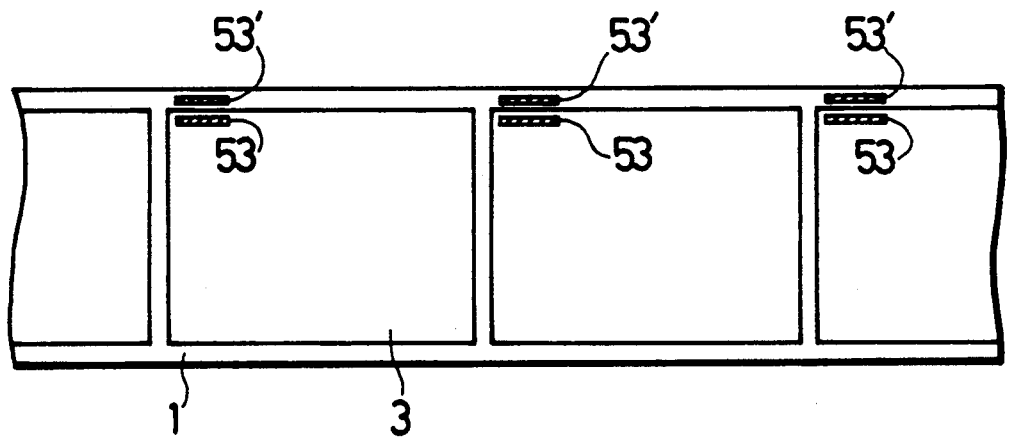

When the cameraman takes a picture, if the free end of the lever 45 is lowered as shown in FIG. 15A, then the light emitting element groups 44 are located at a position corresponding to the lower portion of through-hole 43, so that data 53 is projected on the working area of frame 3 at a position just along the upper edge thereof, as shown in FIG. 16.

If the free end of lever 45 is moved upward, as shown in FIG. 15B, then light emitting element groups 44 are located at a position corresponding to the upper portion of through-hole 43, so that data 53' is recorded outside the effective area of frame 3, at a position just along the upper edge thereof, as shown in FIG. 16.

FIGS. 17A to 17G show examples of data that can be projected on the photographic film by the six light emitting element groups 44, respectively.

FIG. 17A illustrates date data (Dec. 24, 1988), FIG. 17B illustrates time and date data (10:05, 24th), and FIG. 17C illustrates time data (10:05.34). FIGS. 17D and 17E illustrate photographic data, for example, the aperture is 5.6 and the shutter speed is 1/500 second and aperture is 1.4 and the shutter speed is quite slow (L) for example, 12 seconds. FIGS. 17F and 17G illustrate optional data, for example, in which a lens is a zoom lens of 70 to 135 mm and a lens is a telephoto lens of 105 mm with an F-stop of 3.5, respectively.

FIG. 17H illustrates the font of numerals and characters which can be used as data 53 or 53'. These numerals and characters can be selectively projected inside or outside of the frame 3, because the light emitting element groups 44 are movable by means of the assembly shown in FIGS. 15A-15B.

FIGS. 18A to 18D are diagrammatic representations of a photographic format for film 1, in which the minimum amount for detecting film transport is selected to be 5.25 mm. Similarly, FIGS. 19A to 19D are diagrammatic representations of a photographic format for film 1, in which the minimum value for detecting film transport is selected to be 6.28 mm. Throughout FIGS. 18A to 19D, the width W of photographic film is 35 mm, which is equal to the width of the existing, conventional photographic film, however, the photographic film is not provided with perforations.

Figure 18A:
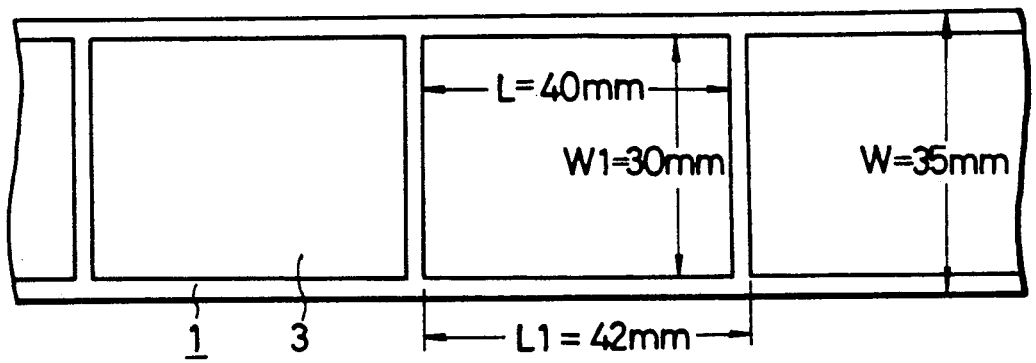
FIGS. 18A to 18D are plan views of a portion of 35 mm-wide photographic film according to an embodiment of the present invention, in which the minimum detected film transport amount is selected to be 5.25 mm.

In the example shown in FIG. 18A, a frame 3 in photographic film 1 defines an effective photographic area (see FIG. 1A) whose effective width W1 in the film-width direction is selected to be 30 mm and whose effective length L in the lengthwise direction of photographic film 1 is selected to be 40 mm. A pitch L1 of frame 3, which is the transport pitch of photographic film 1, is selected to be 42.0 mm. The size and pitch of frame 3 are selected in accordance with existing television broadcasting system standards, and the aspect ratio of frame 3 is selected as 3:4.

Figure 18B:
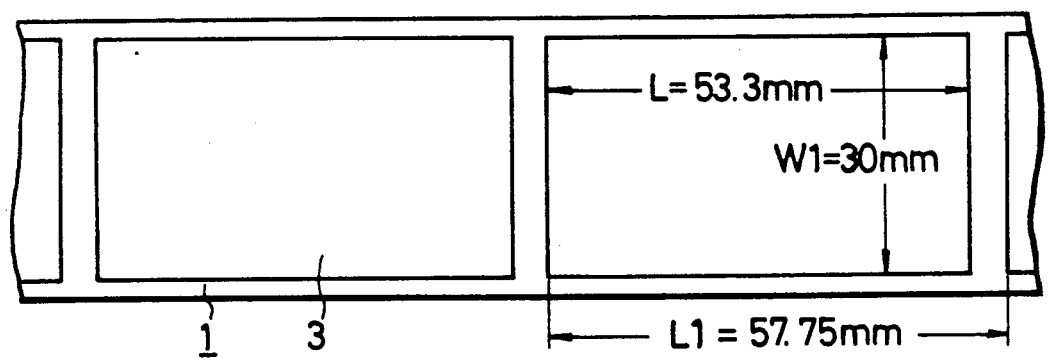

In the embodiment shown in FIG. 18B, the effective width W1 of the effective photographic area of frame 3 is selected to be 30 mm, the effective length L is selected to be 53.3 mm, and the pitch L1 of frame 3 is selected to be 57.75 mm. These values are selected so as to conform to the standards of the high definition television (HDTV) system, which is the so-called Hi-Vision system. In this event, the aspect ratio of frame 3 is selected to be 9:16.

Figure 18C:
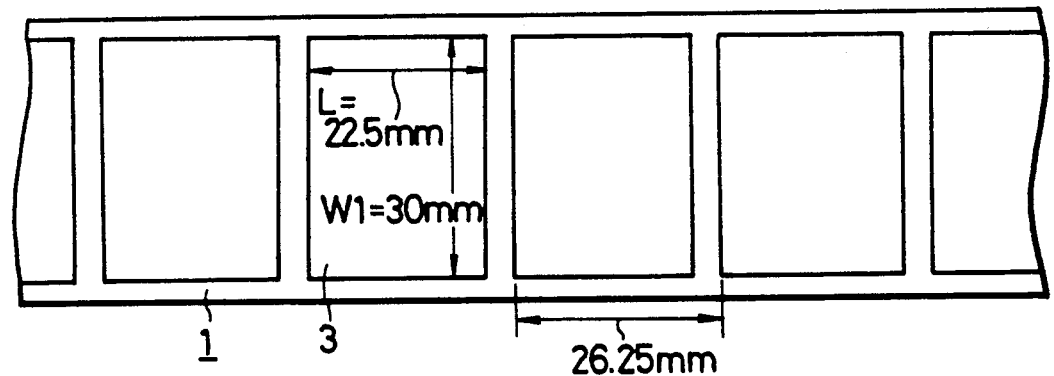
Figure 18D:
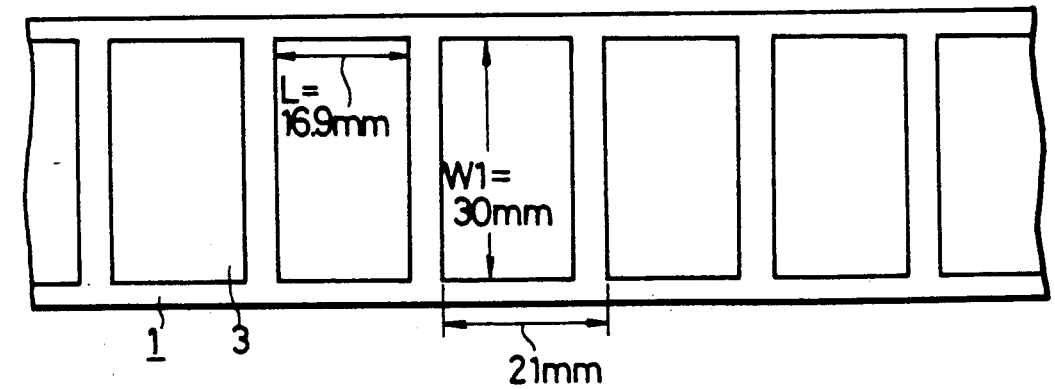

The values in FIGS. 18A and 18B presented above are for when a cameraman takes a full-size picture. On the other hand, when a cameraman takes a half-size picture, or half-frame picture, the size of frame 3 is changed to be 30 mm×22.5 mm, and the transport pitch of the film 1 is changed to 26.5 mm, and the transport pitch of the film 1 is changed to 26.5 mm for the existing television broadcasting system standard, as represented in FIG. 18C. The size of frame 3 is changed to 30 mm×16.9 mm and the transport pitch of the film 1 is changed to 21.0 mm for the HDTV system, as shown in FIG. 18D. Thus, even when a cameraman takes a half-size picture, the length of frame 3 on the longer side is approximately 36 mm, which is the length of the frame in the lengthwise direction for a full-size picture, thereby providing an image quality substantially equal to that of the full-sized picture of the existing film.

Since the minimum detected value of film transport amount is selected to be 5.25 mm as noted above, the film transport amount (transport pitch) in the photographic formats of the film in FIGS. 18A to 18D is selected to be equal to o an integral multiple of the minimum detectable value of film transport, that is, 5.25 mm. Thus, the film transport pitches in FIGS. 18A to 18D are calculated as $$42.00 \text{ mm} = 5.25 \text{ mm} \times 8$$

$$57.75 \text{ mm} = 5.25 \text{ mm} \times 11$$

$$26.25 \text{ mm} = 5.25 \text{ mm} \times 5$$

$$21.0 \text{ mm} = 5.25 \text{ mm} \times 4$$

The diameter of the detection roller 10A for detecting the film transport amount is selected to 3.34 mm in the manner described above.

Other examples of transport pitch for frame 3 shown in FIGS. 18A to 18D are represented in FIGS. 19A to 19D, respectfully. In FIGS. 19A to 19D, the film transport amounts, or transport pitches, are each selected to be approximately equal to an integral multiple of the minimum detectable film transport amount, that is, 6.28 mm. Thus, the film transport pitches in FIGS. 19A to 19D are calculated as $$44.0 \text{ mm} = 6.28 \text{ mm} \times 7$$

$$56.5 \text{ mm} = 6.28 \text{ mm} \times 9$$

$$25.1 \text{ mm} = 6.28 \text{ mm} \times 4$$

The diameter of detection roller 10A for detecting the film transport amount is determined to 4.0 mm and the minimum detected value of film transport is 6.28 mm. Such that:

$$6.28 \text{ mm} = \pi \times 4.00 \text{ mm}/2$$

Figure 19A:
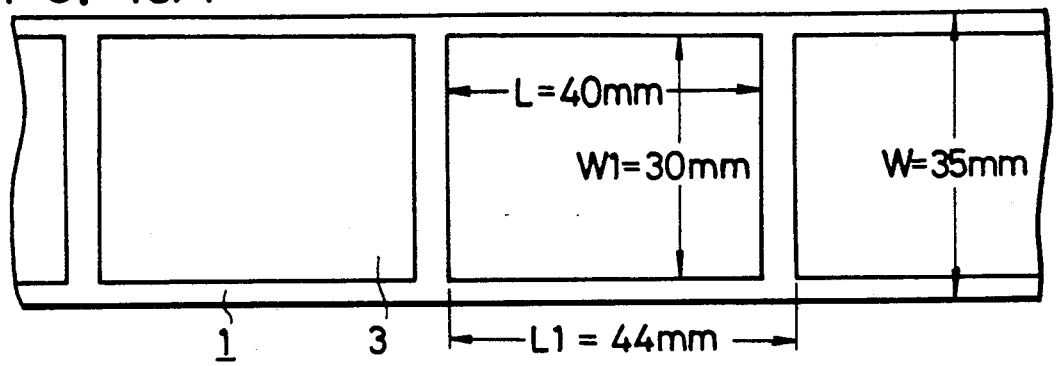
FIGS. 19A to 19D are plan views of a portion of 35 mm-wide photographic film according to an embodiment of the present invention, in which the minimum detected film transport amount is selected to be 6.28 mm.
Figure 19B:
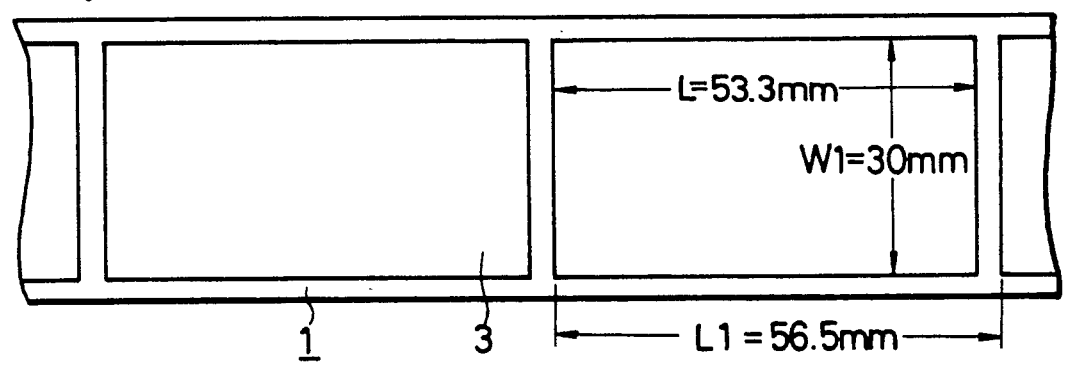
Figure 19C:
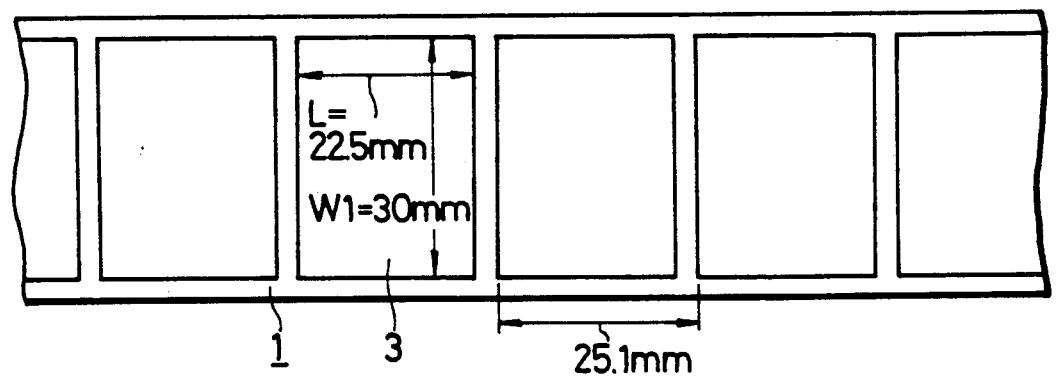
Figure 19D:
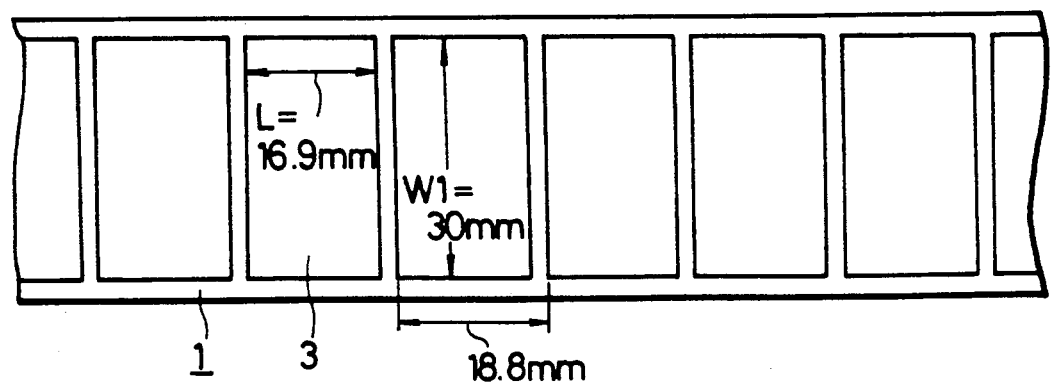

The above-mentioned respective values in FIGS. 19A and 19B are presented in accordance with the existing television broadcasting system standards and the HDTV system standards when a cameraman takes a full-size picture, while the respective values in FIGS. 19C and 19D are presented similarly when a cameraman takes a half-size picture.

Figure 20A:
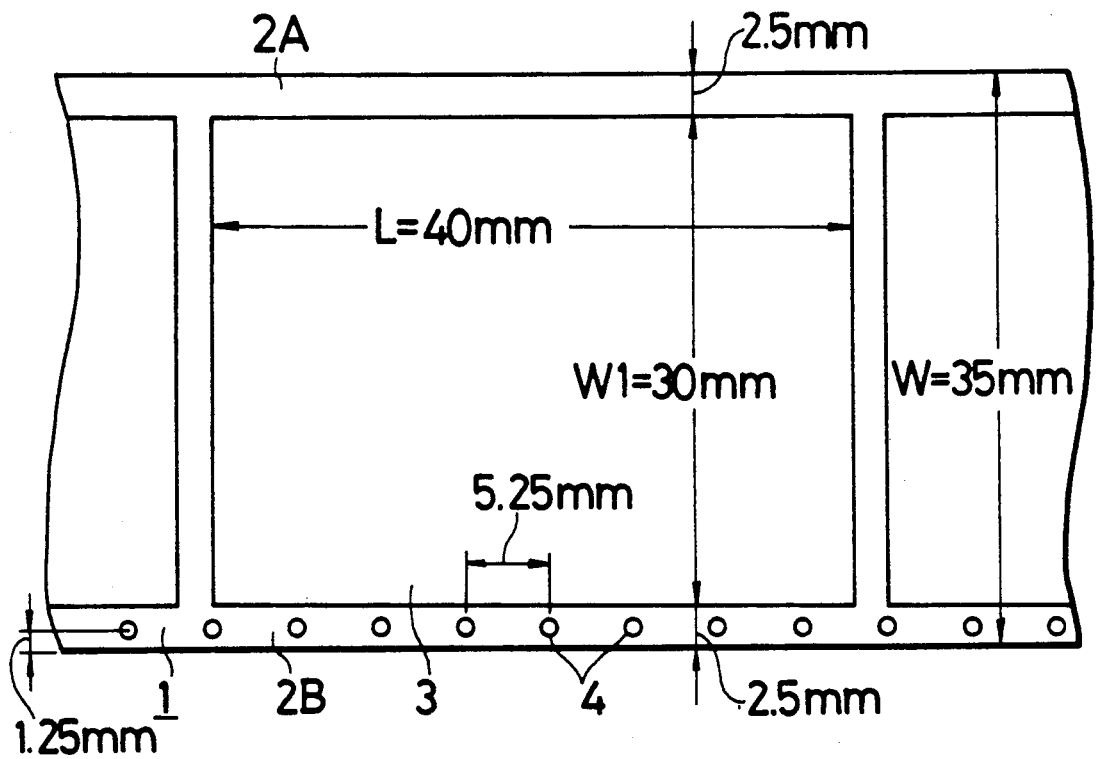
FIG. 20A is plan view of a portion of 35 mm-wide photographic film having perforations according to an embodiment of the present invention, in which the minimum detected film transport amount is 5.25 mm.
Figure 20B:
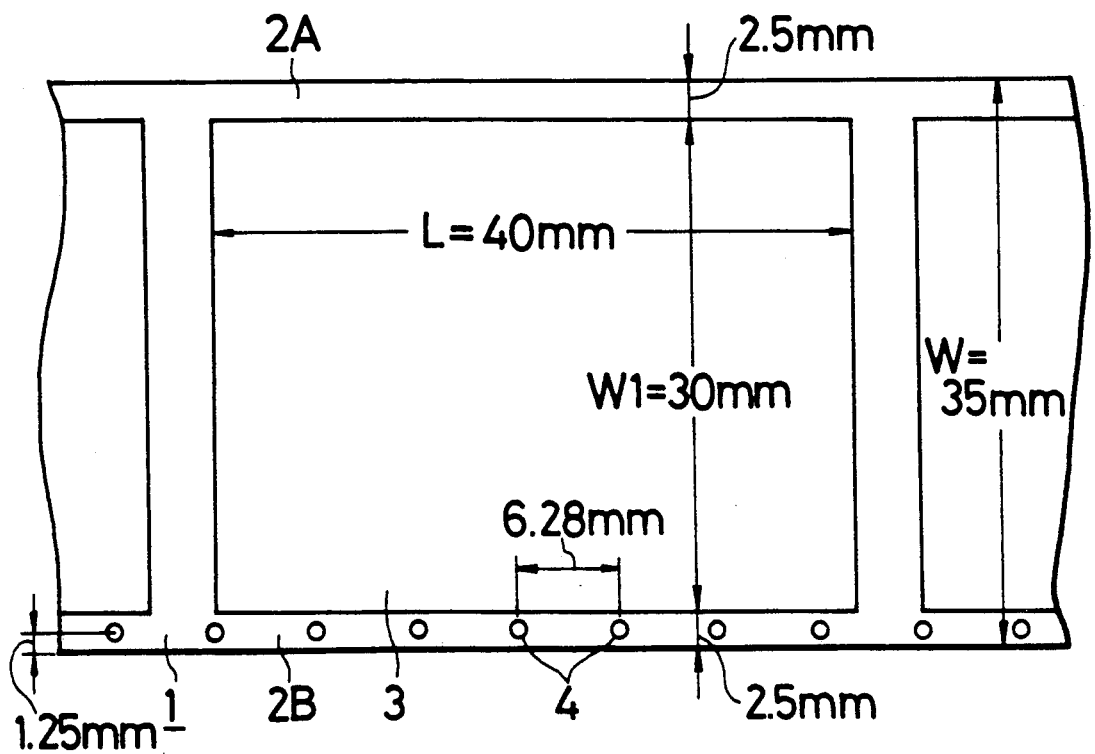
FIG. 20B is plan view of a portion of 35 mm-wide photographic film having perforations according to an embodiment of the present invention, in which the minimum detected film transport amount is 6.28 mm.

FIGS. 20A and 20B are further embodiments of a photographic film according to the present invention, in which a plurality of small apertures 4 are formed through film 1 along a lower non-photographic area 2B of film 1. These small apertures 4 are used to detect the transport amount of photographic film 1 having a format as shown in FIG. 18A. Small apertures 4 each have a diameter of 1 mm and are aligned and positioned in from one edge of photographic film 1 by approximately 1.25 mm. Specifically, on a center line between the lower edge of photographic film 1 and the lower edge of frame 3 at a predetermined pitch, for example, 5.25 mm, as shown in FIG. 20A. Similarly, for the format of photographic film 1 as shown in FIG. 19A, small apertures 4 are aligned at a pitch of 6.28 mm, as shown in FIG. 20B.

Because the pitch of small apertures 4 is selected to be 5.25 mm or 6.28 mm based on the above reasons, the format of the photographic film 1 can be suitably applied to the existing television broadcasting system standard and to the HDTV system standard and it also can be readily applicable to both full-size pictures and half-size pictures.

More specifically, when the photographic film is transported in the camera body, the number of small apertures 4 is counted by the photo-interrupter utilizing infra-red rays. When the counted number of the small apertures 4 reaches a predetermined value, the transport of the photographic film is stopped, so that the frames are automatically formed on the photographic film having the correct pitch.

In the examples shown in FIGS. 20A and 20B, small apertures 4 are aligned on the lower non-photographic area 2B, whereas apertures 4 are aligned on the upper non-photographic area 2A in FIG. 2. The reason for this is that the location of the small aperture 4 is determined in response to the location of the photo-interrupter and the means for recording information on the photographic film of the camera.

Throughout FIGS. 18A to 18D, 19A to 19D and 20A to 20B, the photographic area is exposed to light by an effective photographic area of a size different than those explained in connection with FIGS. 3 and 4. This can be achieved by properly matching the size of the rectangular aperture 19 and the lens system 13, as shown in FIGS. 3 and 4. Furthermore, while small apertures 4 are aligned on the opposite side or lower side of the film, they may be located relatively anywhere in accordance with the location of the photo-interrupter.

Unlike conventional photographic film, which is transported by the engagement between camera sprockets and film perforations, the photographic film of the present invention eliminates the perforations in order to increase the effective photographic area in the widthwise direction. Also, the unused area of the photographic film is made wide enough to receive projected data, yet the flatness of the photographic film can be maintained. Further, with the movable data projecting mechanism of the photographic camera of the present invention, the unused area of this photographic film 1 can be effectively utilized.

To accomplish the above-mentioned objects of the present invention, the photographic film 1 might be either a positive photographic film or a negative photographic film.

Furthermore, photograph data may be recorded in the non-effective photographic area between the edge of the photographic film and the frame, and data indicating the standard of the photographic film 1 may be previously recorded therein. Also, only one small aperture may be provided per frame, or the small aperture may be replaced with a magnetic mark or the like, and the magnetic sensor and the photo-transistor may be mounted on the rear cover or on the pressure plate.

It should be understood that the above description is presented by way of example on the preferred embodiments of the invention and it will be apparent that many modifications and variations could be effected by one with ordinary skill in the art without departing from the spirit and scope of the novel concepts of the invention, which should be determined only by the appended claims.

What is claimed is:

1. A photographic camera system using a 35 mm-wide photographic film in a cartridge comprising:
   a 35 mm-wide photographic film devoid of sprocket holes and having a quadrilateral effective photographic area of which one side in the width direction of the photographic film is selected to be substantially 30 mm long and being wound in a standard size 35-mm film cartridge;
   a camera body having a first accommodating portion formed in said camera body to accommodate the standard size 35-mm film cartridge and a second accommodating portion formed in said camera body to accommodate said photographic film supplied from the cartridge;
   transporting means provided in said camera body for transporting said photographic film between said first and second accommodating portions;
   guide means provided in said camera body for defining the position of said photographic film in its width-wise direction between said first and second accommodating portions and including two pairs of parallel film guide rails formed on a rearwardly facing inner surface of said camera body, a first one of said pairs of film guides being spaced apart by substantially 35-mm and extending rearwardly for a predetermined distance and a second one of said pairs of film guides being spaced apart by substantially 30-mm and extending rearwardly for a distance less than said predetermined distance; and
   exposing means provided in said camera body for exposing an image of an object to be photographed onto the effective photographic area of said photographic film guided by said guide means.

2. A photographic camera system using a 35 mm-wide photographic film according to claim 1, in which said exposing means includes an aperture substantially 30 mm long in the film-width direction and substantially 40 mm wide in the film transporting direction.

3. A photographic camera system using a 35 mm-wide photographic film according to claim 1, in which the aperture of said exposing means has a ratio of 3:4 between its dimension in the film-width direction and its dimension in its film transporting direction.

4. A photographic camera system using a 35 mm-wide photographic film according to claim 1, in which said transporting means includes a film wind shaft about which the film is taken up and a film guide roller means contacting the photographic film and being rotated as the photographic film is wound on said film wind shaft for detecting a film transport amount and producing a detected signal; and control means for controlling the film transport amount in response to said detected signal.

5. A photographic camera system using a 35 mm-wide film according to claim 4, in which said detected signal is produced for every predetermined film transport amount.

6. A photographic camera system using a 35 mm-wide film according to claim 5, in which said predetermined film transport amount is substantially 5.25 mm.

7. A photographic camera system using a 35 mm-wide film according to claim 5, in which said predetermined film transport amount is substantially 6.28 mm.

8. A photographic camera system using a 35 mm-wide photographic film according to claim 4, in which said film guide roller mounted for rotation in response to transporting the photographic film from said first accommodating portion to said second accommodating portion cooperates with a corresponding sensor element for producing said detected signal.

9. A photographic camera system using a 35 mm-wide photographic film according to claim 8, in which said means contacting the photographic film further includes at least one pivotably mounted film guide element arranged adjacent said film wind shaft and having said film guide roller rotatable mounted thereon, and in which a permanent magnet is mounted on said film guide roller for cooperating with said sensor element that is mounted on said pivotably mounted film guide element.

10. A photographic camera system using a 35 mm-wide photographic film according to claim 9, in which said pivotably mounted film guide element includes a spring for biasing said film guide roller mounted on said film guide element toward said film wind shaft and into contact with said film wound therearound.

11. A photographic camera system using a 35 mm-wide photographic film according to claim 1, in which said transporting means includes means for detecting a control element formed along one edge of said photographic film and outside of said effective photographic area, said means for detecting being located between said first and second accommodating portions and generating a detected signal, and control means for controlling the film transport amount in response to said detected signal.

12. A photographic camera system using a 35 mm-wide photographic film according to claim 11, in which said control element comprises a small aperture having a diameter of substantially 1 mm and said means for detecting comprises a light emitting diode in juxtaposition with a photo-transistor for detecting the passage of said small aperture therebetween.

13. A photographic system using a 35 mm-wide film according to claim 12, in which a plurality of said small apertures are aligned at a predetermined pitch.

14. A photographic system using a 35 mm-wide film according to claim 13, in which said predetermined pitch is substantially 5.25 mm.

15. A photographic system using a 35 mm-wide film according to claim 13, in which said predetermined pitch is substantially 6.28 mm.

16. A photographic camera system using a 35 mm-wide photographic film comprising:
   a 35 mm-wide photographic film having a quadrilateral effective photographic area of which one side is substantially 30 mm long and detection elements arranged along one longitudinal edge thereof, said photographic film being devoid of sprocket holes;

cartridge means for accommodating said photographic film being wound therein;

a camera body having a first accommodating portion formed in said camera body for accommodating said cartridge means and a second accommodating portion formed in said camera body for accommodating said photographic film supplied from said cartridge means;

transporting means provided on said camera body for transporting said photographic film between said first and second accommodating portions;

means for detecting said detection elements as said film is transported for determining the amount of film transported by said transporting;

guide means provided in said camera body for defining the position of said photographic film in the width-wise direction between said first and second accommodating portions and including first and second pairs of parallel film guide rails formed on an inner surface of said camera body, said first pair of film guide rails extending from said inner surface for a predetermined distance and said second pair extending for a distance substantially equal to said predetermined distance less a thickness of said photographic film;

exposing means provided in said camera body and for exposing an image of an object to the effective photographic area of said photographic film guided by said guide means.

17. A photographic camera system using a 35 mm-wide photographic film according to claim 16, in which said means for recording includes light emitting means selectively movable from a first position in which data is recorded in an area between an outer longitudinal edge portion of said photographic film and an end edge portion of said effective photographic area of said photographic film to the second position in which the data is recorded in an area in said effective photographic area.

18. A photographic camera system using a 35 mm-wide film according to claim 16, in which said transporting means includes means for detecting a control element formed along one edge of said photographic film and outside of said effective photographic area, said means for detecting being located between said first and second accommodating portions and generating a detected signal, and control means for controlling the film transport amount in response to said detected signal.

19. A photographic camera system using a 35 mm-wide film according to claim 18, in which said control element comprises a small aperture having a diameter of substantially 1 mm and said means for detecting comprises a light emitting diode in juxtaposition with a photo-transistor for detecting the passage of said small aperture therebetween.

20. A photographic camera system using a 35 mm-wide film according to claim 19, in which a plurality of said small apertures are aligned at a predetermined pitch.

21. A photographic camera system using a 35 mm-wide film according to claim 20, in which said predetermined pitch is substantially 5.25 mm.

22. A photographic camera system using a 35 mm-wide film according to claim 20, in which said predetermined pitch is substantially 6.28 mm.

23. A photographic camera system using a 35 mm-wide photographic film according to claim 16, in which said transporting means includes a film wind shaft arranged for winding film therearound and at least one film guide roller mounted adjacent said film wind shaft in contact with film wound therearound for rotation in response to transporting the photographic film from said first accommodating portion to said second accommodating portion for cooperating with a corresponding sensor element for producing a film transport detected signal.

24. A photographic camera system using a 35 mm-wide film according to claim 23, in which the diameter of said film guide roller is substantially 3.34 mm.

25. A photographic camera system using a 35 mm-wide film according to claim 23, in which the diameter of said film guide roller is substantially 4.00 mm.

26. A photographic camera system using a 35 mm-wide photographic film according to claim 23, in which said transporting means further includes at least one pivotably mounted film guide element having said at least one film guide roller mounted thereon, and in which a permanent magnet is mounted on said film guide roller for cooperating with said sensor element that is mounted on said pivotably mounted film guide element.

27. A photographic camera system using a 35 mm-wide photographic film according to claim 26, in which said pivotally mounted film guide element includes a spring for biasing said film guide roller mounted on said film guide element toward said film wind shaft and in contact with said film wound therearound.

28. A photographic camera using a 35 mm-wide photographic film devoid of sprocket holes comprising:

a camera body having first and second accommodating portions formed in said camera body for accommodating a 35 mm-wide photographic film devoid of sprocket holes;

transporting means provided in said camera body for transporting the photographic film devoid of sprocket holes from said first accommodating portion to said second accommodating portion;

a quadrilateral aperture formed in said camera body on a film transporting path between said first accommodating portion and said second accommodating portion, one side of which in a film-width direction is substantially 30 mm long, so as to form a quadrilateral effective photographic area, one side of which in the film-width direction is 30 mm long, in the photographic film extending along said film transporting path; and two pairs of parallel film guide rails formed on a rearwardly facing inner surface of said camera body, a first one of said pairs being outside of the other of said pairs and extending rearwardly for a first distance, a second one of said pairs being inside the other of said pairs and extending rearwardly for a distance less than said first distance, whereby said photographic film is guided by said two pairs of film guide rails.

29. A photographic camera using a 35 mm-wide photographic film according to claim 28, in which another side of said quadrilateral aperture in the film transporting direction is substantially 40 mm long.

30. A photographic camera using a 35 mm-wide photographic film according to claim 28, in which said film guide rails are arranged adjacent said aperture for guiding the longitudinal edges of the photographic film and forming in the photographic film extending along said film transporting path a strip of about 2.5 mm wide between a longitudinal edge portion of the photographic film and an edge of said effective photographic area.

31. A photographic camera using a 35 mm-wide photographic film according to claim 28, wherein said film transporting means includes detecting means contacting the photographic film transported by said film transporting means for detecting a transport amount of the photographic film and for generating a detected signal; and means for controlling the transport amount so the photographic film in response to said detected signal from said detecting means.

32. A photographic camera using a 35 mm-wide film according to claim 31, in which said detected signal is produced for every predetermined film transport amount.

33. A photographic camera using a 35 mm-wide film according to claim 32, in which said predetermined film transport amount is substantially 5.25 mm.

34. A photographic camera using a 35 mm-wide film according to claim 32, in which said predetermined film transport amount is substantially 6.28 mm.

35. A photographic camera system using a 35 mm-wide photographic film according to claim 31, in which said detecting means contacting the photographic film includes a film wind shaft arranged for winding film therearound and at least one film guide roller mounted adjacent said film shaft and in contact with the film wound therearound for rotation in response to transporting the photographic film from said first accommodating portion to said second accommodating portion and cooperating with a corresponding sensor element for producing said detected signal.

36. A photographic camera system using a 35 mm-wide photographic film according to claim 35, in which said detecting means contacting the photographic film further includes at least one pivottably mounted film guide element having said at least one film guide roller mounted thereon, and in which a permanent magnet is mounted on said film guide roller for cooperating with said sensor element that is mounted on said pivottably mounted film guide element.

37. A photographic camera system using a 35 mm-wide photographic film according to claim 36, in which said pivotally mounted film guide element includes a spring for biasing said film guide roller mounted on said film guide element toward said film wind shaft and into contact with said film wound therearound.

38. A photographic camera using a 35 mm-wide film according to claim 28, in which said transporting means includes means for detecting a control element formed along one edge of said photographic film and outside of said effective photographic area, said means for detecting being located between said first and second accommodating portions and generating a detected signal, and control means for controlling the film transport amount in response to said detected signal.

39. A photographic camera using a 35 mm-wide film according to claim 38, in which said control element comprises a small aperture having a diameter of substantially 1 mm and said means for detecting comprises a light emitting diode in juxtaposition with a photo-transistor for detecting the passage of said small aperture therebetween.

40. A photographic camera using a 35 mm-wide film according to claim 39, in which a plurality of said small apertures are aligned at a predetermined pitch.

41. A photographic camera using a 35 mm-wide film according to claim 40, in which said predetermined pitch is substantially 5.25 mm.

42. A photographic camera using a 35 mm-wide film according to claim 40, in which said predetermined pitch is substantially 6.28 mm.

43. A photographic camera using a 35 mm-wide photographic film devoid of sprocket holes comprising:
a camera body having first and second accommodating portions formed in said camera body for accommodating a 35 mm-wide photographic film;
transporting means provided in said camera body for transporting the photographic film from said first accommodating portion wherein a standardized 35-mm film cartridge containing the photographic film resides to said second accommodating portion;
a quadrilateral aperture formed in said camera body in a film transporting path from said first accommodating portion to said second accommodating portion, one side of said aperture in the film-width direction is substantially 30 mm long so that a quadrilateral effective photographic area having alone side in the film-width direction that is 30 mm long is formed in the photographic film extending along said film transporting path;
first and second pairs of parallel film guide rails formed on an inner surface of camera body, said first pair being outside said second pair of guide rails and extending from said inner surface for a predetermined distance greater than a distance that said second pair extends for guiding said photographic film therebetween; and
recording means for recording information in an area between a longitudinal edge portion of the photographic film and an edge of said effective photographic area.

44. A photographic camera using a 35 mm-wide photographic film according to claim 43, in which said transporting means includes a film wind shaft arranged for winding film therearound and at least one film guide roller mounted for rotation in response to transporting the photographic film from said first accommodating portion to said second accommodating portion for cooperating with a corresponding sensor element for producing a film transport detected signal.

45. A photographic camera using a 35 mm-wide film according to claim 44, in which a diameter of said film guide roller is substantially 3.34 mm.

46. A photographic camera using a 35 mm-wide film according to claim 44, in which a diameter of said film guide roller is substantially 4.00 mm.

47. A photographic camera using a 35 mm-wide photographic film according to claim 44, in which said transporting means further includes at least one pivotably mounted film guide element arranged adjacent said film wind shaft and having said at least one film guide roller mounted thereon, and in which a permanent magnet is mounted on said film guide roller for cooperating with said sensor element that is mounted on said pivotably mounted film guide element.

48. A photographic camera using a 35 mm-wide photographic film according to claim 47, in which said pivotally mounted film guide element includes a spring for biasing said film guide roller mounted on said film guide element toward said film wind shaft and into contact with said film wound therearound.

49. A photographic camera using a 35 mm-wide photographic film according to claim 43, in which said transporting means includes means for detecting a control element formed along one edge of said photographic film and outside of said effective photographic area, said means for detecting being located between said first and second accommodating portions and generating a detected signal, and control means for controlling the film transport amount in response to said detected signal.

50. A photographic camera using a 35 mm-wide photographic film according to claim 49, in which said control element comprises a small aperture having a diameter of substantially 1 mm and said means for detecting comprises a light emitting diode in juxtaposition with a photo-transistor for detecting the passage of said small aperture therebetween.

51. A photographic camera using a 35 mm-wide photographic film according to claim 50, in which a plurality of said small apertures are aligned at a predetermined pitch.

52. A photographic camera using a 35 mm-wide photographic film according to claim 51, in which said predetermined pitch is substantially 5.25 mm.

53. A photographic camera using a 35 mm-wide photographic film according to claim 51, in which said predetermined pitch is substantially 6.28 mm.

54. A film cartridge comprising:

a photographic film of the kind that is 35 mm wide and devoid of sprocket perforations along both side edges of said film and having a quadrilateral effective photographic area whose one side in the film-width direction is substantially 30 mm long; and a single casing means for accommodating said 35 mm wide photographic film therein with a leader portion of the film protruding therefrom and being generally cylindrical in shape and having a lower protruding element for residing in a recess of a 35-mm camera and having an upper recess for engagement by a film rewind element of the 35-mm camera.

55. A film cartridge according to claim 54, in which a control portion is formed on said photographic film in a portion between a longitudinal edge of said photographic film and an edge of said effective photographic area.

56. A film cartridge according to claim 55, in which said control portion comprises small round aperture.

57. A film cartridge according to claim 56, in which said small aperture has a diameter of 1 mm.

58. A film cartridge according to claim 55, in which a plurality of said control portions are aligned at a predetermined pitch.

59. A film cartridge according to claim 58, in which said predetermined pitch is substantially 5.25 mm.

60. A film cartridge according to claim 58, in which said predetermined pitch is substantially 6.28 mm.

61. A film cartridge according to claim 55, in which said control portion is formed as a magnetic mark.

* * * * *